United States Patent
Bushnell

(10) Patent No.: US 8,070,633 B2
(45) Date of Patent: Dec. 6, 2011

(54) ECCENTRIC BOTTOM BRACKET ASSEMBLY

(75) Inventor: Dennis L. Bushnell, Auburn, WA (US)

(73) Assignee: Bikebiz, III, Inc., Seattle, WA (US)

(*) Notice: Subject to any disclaimer, the term of this patent is extended or adjusted under 35 U.S.C. 154(b) by 564 days.

(21) Appl. No.: 11/740,839

(22) Filed: Apr. 26, 2007

(65) Prior Publication Data
US 2008/0268994 A1    Oct. 30, 2008

(51) Int. Cl.
| F16H 7/10 | (2006.01) |
| B60B 37/00 | (2006.01) |
| B62K 1/00 | (2006.01) |
| B62K 3/00 | (2006.01) |
| B62K 5/00 | (2006.01) |
| B62K 7/00 | (2006.01) |
| B62K 9/00 | (2006.01) |
| B62K 11/00 | (2006.01) |
| B62K 13/00 | (2006.01) |
| B62K 15/00 | (2006.01) |

(52) U.S. Cl. ............ 474/112; 301/1; 280/282; 280/264; 280/261; 280/152.1; 464/182; 464/183; 464/184; 464/185

(58) Field of Classification Search .................. 474/112; 301/1; 280/282, 264, 261, 152.1; 464/182–185
See application file for complete search history.

(56) References Cited

U.S. PATENT DOCUMENTS

| 423,051 | A | * | 3/1890 | Haven ............................. 301/1 |
| 586,624 | A | * | 7/1897 | Roberts ......................... 474/112 |
| 605,743 | A | * | 6/1898 | Pinover ......................... 474/112 |
| 620,241 | A | * | 2/1899 | Levedahl ....................... 474/112 |
| 3,717,361 | A | * | 2/1973 | Vanderpool ................... 280/229 |
| 4,588,232 | A | * | 5/1986 | Kim et al. ......................... 301/1 |
| 4,602,822 | A | * | 7/1986 | Kim et al. ......................... 301/1 |
| 4,808,147 | A | | 2/1989 | Graham |
| 5,755,635 | A | * | 5/1998 | Scaramozzino .............. 474/150 |
| 6,019,435 | A | * | 2/2000 | Bach .......................... 301/105.1 |
| 6,186,918 | B1 | * | 2/2001 | Yoo ................................ 474/112 |
| 6,371,571 | B1 | * | 4/2002 | Tsan .......................... 301/110.5 |
| 6,474,432 | B1 | * | 11/2002 | Schmidt et al. ............... 180/209 |
| 7,217,037 | B2 | | 5/2007 | Dodman et al. |

* cited by examiner

Primary Examiner — Michael Mansen
Assistant Examiner — Henry Liu
(74) Attorney, Agent, or Firm — Miller Nash LLP

(57) ABSTRACT

An eccentric bottom bracket assembly having a body member, at least two wing members, a wedge driver with two wedge members, and at least one spring member altogether forming a tubular, cylindrical assembly to fit within the inner shell of the bottom bracket area of the bicycle frame for adjusting the chain length or tension. The assembly is preferably used for the front and rear bottom brackets of a tandem bicycle for adjusting the chain that is connected to the front and rear driving sprockets. The assembly is also alternatively used in single-rider bicycles and other bicycles with the need for adjusting chain tension. The assembly allows for the wing members and the body member to circumferentially and outwardly expand or inwardly retract by co-acting with the rotation of the wedge driver which laterally displaces the wedge members in a parallel direction relative to the longitudinal axis of the body member.

24 Claims, 5 Drawing Sheets

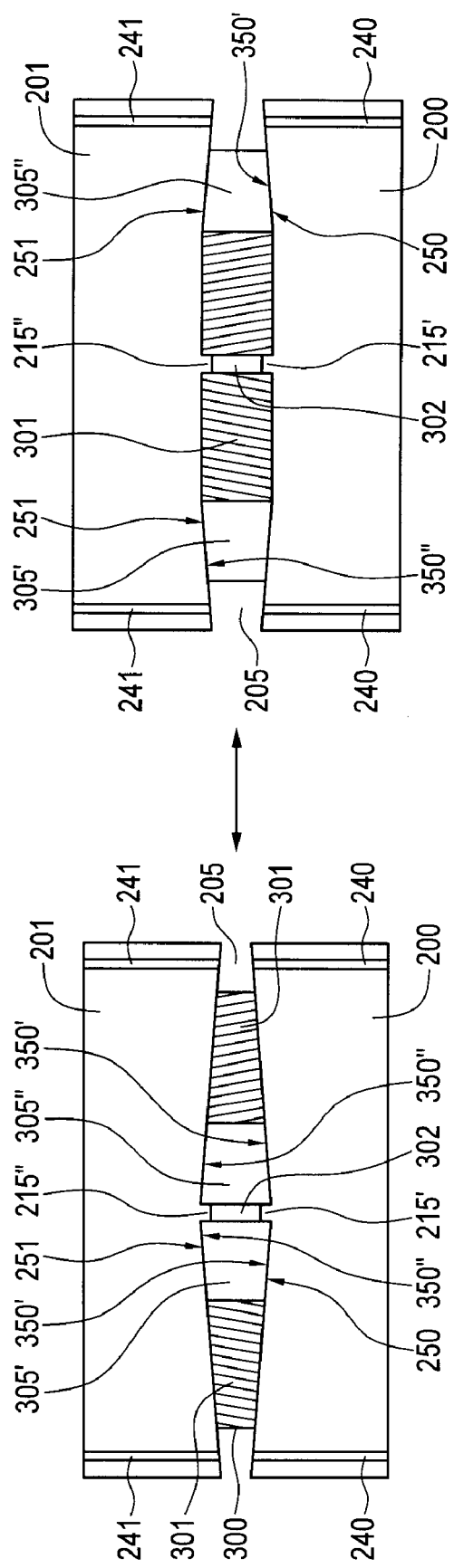

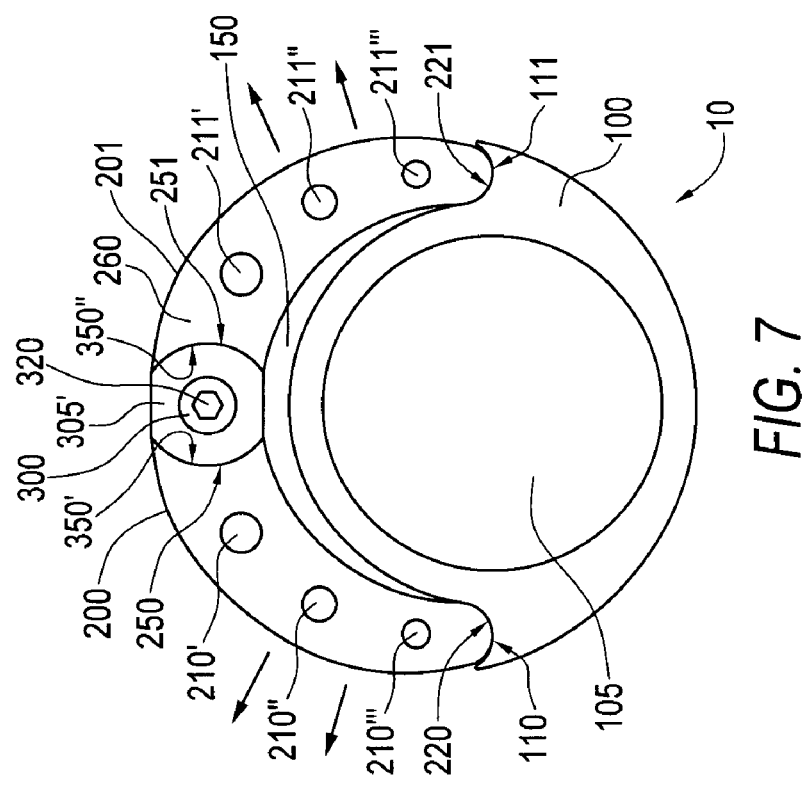
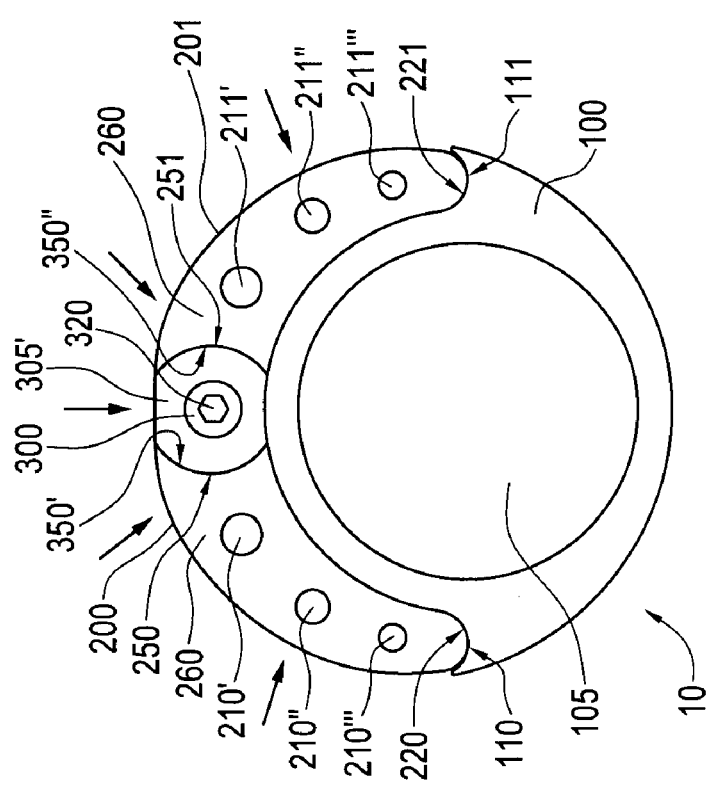

ECCENTRIC BOTTOM BRACKET ASSEMBLY

FIELD OF INVENTION

The present invention relates to an improved eccentric bottom bracket assembly for bicycles. More specifically, the present invention relates to an eccentric bottom bracket assembly that is used in connection with adjusting the chain of a bicycle.

BACKGROUND OF THE INVENTION

Bicycles generally work when bicyclists manually and rotatably push on pedals attached to cranks which are connected to the rear bottom bracket axle or spindle with front and rear driving brackets coupled by a chain between the two bottom brackets. In order for bicycles to function properly, appropriate tension of the chain has to be maintained. Even though it may be impractical to fine tune the chain length or tension precisely, slight repositioning or adjustment of the chain tension utilizing certain components is highly desired. By repositioning or adjusting a component of a bicycle, chain tension can be optimized for installing and maintaining the chain. It is a well-known and conventional practice to periodically adjust the rotational axis of the front pedal crank spindle or the rear pedal crank spindle, on which the front and rear driving sprockets are mounted. One of the adjusting components for adjusting the chain length or chain tension of a bicycle is an eccentric mount, which is an assembly in which the rotational axis of the spindle is eccentric to a cylindrical casing or a shell that is rotatable for positional adjustment within the shell of the bottom bracket portion of a bicycle frame.

Typically, the term "eccentric" refers to a wheel that rotates on an axle or spindle bringing about a mechanical motion to operate as a crank or a cam by an attachment to the wheel. This term "eccentric" is commonly used as a cylindrical part for bicycles, particularly for placing the part through the bottom bracket inner shell of a bicycle. The term "bottom bracket" refers to the part of the bicycle frame around which the pedal cranks rotate and also includes other bearings and axle/spindle components such as pedal shafts which run through this bottom bracket inner shell of the bicycle frame. Eccentrics are typically used to adjust the tension of the chain on a bicycle, when the eccentric is rotatably adjusted, the chain is tightened or loosened. An eccentric, positioned in the bottom bracket inner shell, also has an opening or a bore in which the pedal crank assembly or pedal shaft is snugly placed for bicyclists to generate motion by rotatably pushing on the pedals attached to cranks with pedal shafts running through the bore which are securely fastened to the eccentric in the bottom bracket inner shell.

There are different mechanisms for adjusting the eccentric depending on the design of the shell of the bicycle and the eccentric being used. The first design of adjusting the eccentric is by placing the eccentric into the loose bottom bracket shell of the bicycle frame. In this mechanism, the shell is a split shell. After placing the eccentric into the loose bottom bracket shell, the outer shell can be tightened to close any gap of a split shell by utilizing pinch bolts to tightly engage the eccentric to the inner shell. An easy way to conceptualize this mechanism and assembly is to look at bicycles on which the conventional pinch bolts are used to adjust the height of a seat post by loosening or securing the seat tube with small, movable handles on the frame near the seat tube. The second mechanism of adjusting the eccentric is to use a setscrew whereby a screw can fit around and through the outer portion of the shell to tightly engage the eccentric to the inner shell of the bottom bracket. The first design of using pinch bolts requires designing the bicycle with a split shell which results in higher labor and manufacturing costs. The second design requires bicyclists to prepare for situations whereby chains can become loose or undone in a remote location. To prepare for such events, bicyclists are subject to unnecessarily carrying heavy tools which is not feasible nor preferable, particularly for weight-sensitive bicyclists.

A bottom bracket assembly mechanism using a wedge bolt is taught in the U.S. Pat. No. 4,808,147 (the "'147 patent") and U.S. Patent Application Publication No. US2006/0189426 A1 (the "'426 publication"), to Graham and Dodman et al., respectively. Both of these references are directed to an adjustable eccentric bracket assembly for a bicycle using a wedge bolt. Both of these references disclose assemblies limited to particular purposes.

The '147 patent, for example, is directed to an eccentrically mounted pedal crank spindle that is rotatably adjustable in the inner surface of the shell of the bottom bracket of a bicycle frame. The assembly taught in the '147 patent comprises a body member with a major portion having a circular cylindrical external surface that can fit with the inner surface of the shell. The remainder of the external surface of the body member is a flat wedge surface obliquely oriented to the axis of the cylindrical surface to coextensively adapt to a wedge member. The solid wedge member has a circular external cylindrical surface with the same diameter of the body member and a wedge surface that is complementary to the body member. The '147 patent teaches a drive mechanism of rotatably screwing a wedge driver in which the wedge member is displaced laterally to tighten within the inner surface of the shell of a bicycle frame. Even though this assembly solved the problems mentioned in the prior art, the solid, planar, and cylindrical surface of the body member and the solid wedge surface of the wedge member contribute to overall weight of the assembly. Furthermore, the assembly oftentimes contributes to sticking of the wedge to the single planar, flat wedge surface when the wedge is being loosened to adjust the position of the assembly in order to adjust the chain of a bicycle.

The '426 publication is directed to a similar bracket assembly with two wedge members with two external surfaces of the body member which is obliquely oriented to the axis of the cylindrical surface rather than using a single wedge member complimentary to the body member. The eccentric body member also has an external outer cylindrical surface that is provided in close fit with the inner surface of the shell of the bicycle frame. The wedge members are provided to co-act with the body member to alternatively tighten or loosen the body member with respect to the inner shell of the bicycle frame. The body member and the wedge members are similarly provided as in the '147 patent with complimentary wedge surfaces. The wedge members are laterally and perpendicularly displaced relative to the body member to tighten or loosen the fit within the inner surface of the shell. Despite the fact that the overall weight of the bracket assembly is somewhat reduced, the assembly taught in this publication is not designed to accommodate the frictional resistance necessary to sustain and prevent slipping from the correctly adjusted position of the bottom bracket assembly to the inner surface of the shell of the bicycle frame.

Therefore, a design of an eccentric bottom bracket assembly is necessary that further reduces the overall weight of the assembly and provides overall strength and longevity to endure years of wear and tear. A design of an eccentric assembly is also necessary to allow a bicyclist to easily adjust the position of the eccentric bottom bracket assembly when the chain comes undone in a remote location leaving a bicyclist with limited access to tools. An eccentric bottom bracket assembly is also desired that can be universally mounted on any bicycle and utilized from either sides of the bicycle. An eccentric bottom bracket assembly is also desired that is easily adjustable without the jamming of any portion of the assembly within the inner surface of the shell of a bicycle frame.

The present invention is directed to overcoming the foregoing and other disadvantages. More specifically, the present invention is directed to a new and improved eccentric bottom bracket assembly for a bicycle frame on an eccentrically mounted spindle that is rotatably adjustable.

BRIEF SUMMARY OF THE INVENTION

According to the present invention, the assembly is easily adjustable, reusable, durable, light-weight, and does not easily stick within the inner surface of the shell of a bicycle frame. Providing an eccentric bottom bracket assembly with improved features enables optimization of adjusting the chain tension and offers numerous advantages over traditional split shell assembly, setscrew assembly, and previously known eccentric bottom bracket assemblies. The advantages stem mostly from the design of the body member engaged with two wing members co-acting with the two wedge members on the wedge driver. The assembly is preferably used for the front and rear bottom brackets of a tandem bicycle for adjusting the chain that is connected to the front and rear driving sprockets. The assembly is also alternatively used in single-rider bicycles and other bicycles with the need for adjusting chain tension.

According to the present invention, the eccentric bottom bracket assembly includes a body member, two wing members, a wedge driver with two wedge members and at least one spring member altogether forming a tubular, cylindrical assembly to fit within the inner shell of the bottom bracket area of the bicycle frame. The body member is a hollow, tubular, cylindrical shape with protruded portions located on the outer cylindrical portions on the latitudinal axis of the body member provided to fit with the circularly shaped wing members mounted on and around the body member with the internal surfaces of the wing members touching the body member. The wedge driver with two wedge members is also sitting in the interior chamber created between the two wing members and over the body member. The wedge members' flat, bottom surfaces are touching the top of the body member, and the lateral surfaces of the wedge members are touching the internal wedge surfaces of the first and second wing members while snugly fit between the two wing members. In one embodiment of the invention, the entire assembly of the body member, two wing members, and one wedge driver with two wedge members is flexibly and expandably held together by two spring members encircling the body member and the two wing members by way of the slit portions.

In one embodiment of the invention, the wing surfaces of the first and second wing members pivot or slidably move on the wing surfaces of the body member when the wing members are circumferentially and outwardly expanding or inwardly retracting from the body member. The movement of the first and second wing members at the wing surfaces also co-acts with the rotation of the wedge driver which laterally displaces the two wedge members in a parallel direction relative to the longitudinal axis of the body member with a slight lift from the body member in a perpendicular direction from the body member relative to the longitudinal axis of the body member.

According to the present invention, the rotation of the wedge driver causes lateral and parallel displacement of the two wedge members away from each other on and around the wedge driver relative to the longitudinal axis of the body member thereby outwardly and circumferentially expanding the wing members away from the body member to tightly engage the eccentric bottom bracket assembly against the inner surface of bottom bracket of the shell. The opposite rotation of the wedge driver causes lateral and parallel displacement of the two wedge members back toward each other relative to the longitudinal axis of the body member to co-act by condensing the two wing members back towards the body member to loosen the tight engagement of the eccentric bottom bracket assembly from the inner shell of the bottom bracket area. After condensing the two wing members back toward the body member, the eccentric bottom bracket assembly is loose from the inner shell of the bicycle frame allowing for rotatable adjustment of the assembly for adjusting the chain tension or length. The design features of using wing members provides a number of advantages. The wing design with recesses not only reduces the overall weight of the eccentric bottom bracket assembly, the circumferential expanding and condensing mechanism is most superior in preventing sticking of the body member and the wing members against the inner surface of the shell of the bicycle frame.

In one advantageous embodiment of the present invention, the end, perpendicular portions of the wing members have at least one aperture on each wing member for a pin spanner-type tool to fit within one aperture of each wing to rotatably adjust the eccentric bottom bracket assembly in a clockwise or counterclockwise direction in its fully assembled state and retracted position within the shell of a bicycle. Once the assembly is adjusted for the proper chain tension, the wedge driver can be rotated in a clockwise direction to laterally displace the wedge members to co-act for circumferential expansion of the first and second wing members and the body member to tightly engage against the inner surface of the shell.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 4 is a top view of an eccentric bottom bracket assembly of the present invention with the wedge driver with two wedge members positioned in the interior chamber and closely engaged between the two wedge surfaces of a first and second wing members and the two wedge members in a non-laterally displaced and retracted positions.

FIG. 5 is a top view of an eccentric bottom bracket assembly of the present invention with the wedge driver with two wedge members positioned in the interior chamber and closely engaged between the two wedge surfaces of a first and second wing members and the two wedge members in a laterally displaced and expanded positions.

FIG. 6 is a front view of an eccentric bottom bracket assembly of the present invention having a body member with a first and second wing members mounted on top of the body member with a wedge driver with two wedge members sitting on top of the body member and between the first and second wing members in the interior chamber with the wedge members engaged between the wedge surfaces of the wing members in a retracted position.

FIG. 7 is a front view of an eccentric bottom bracket assembly of the present invention having a body member with a first and second wing members mounted on top of the body member with a wedge driver with two wedge members sitting on top of the body member and between the first and second wing members in the interior chamber with the wedge members engaged between the wedge surfaces of the two wing members in an expanded position.

DETAILED DESCRIPTION OF THE INVENTION

Figure 1:
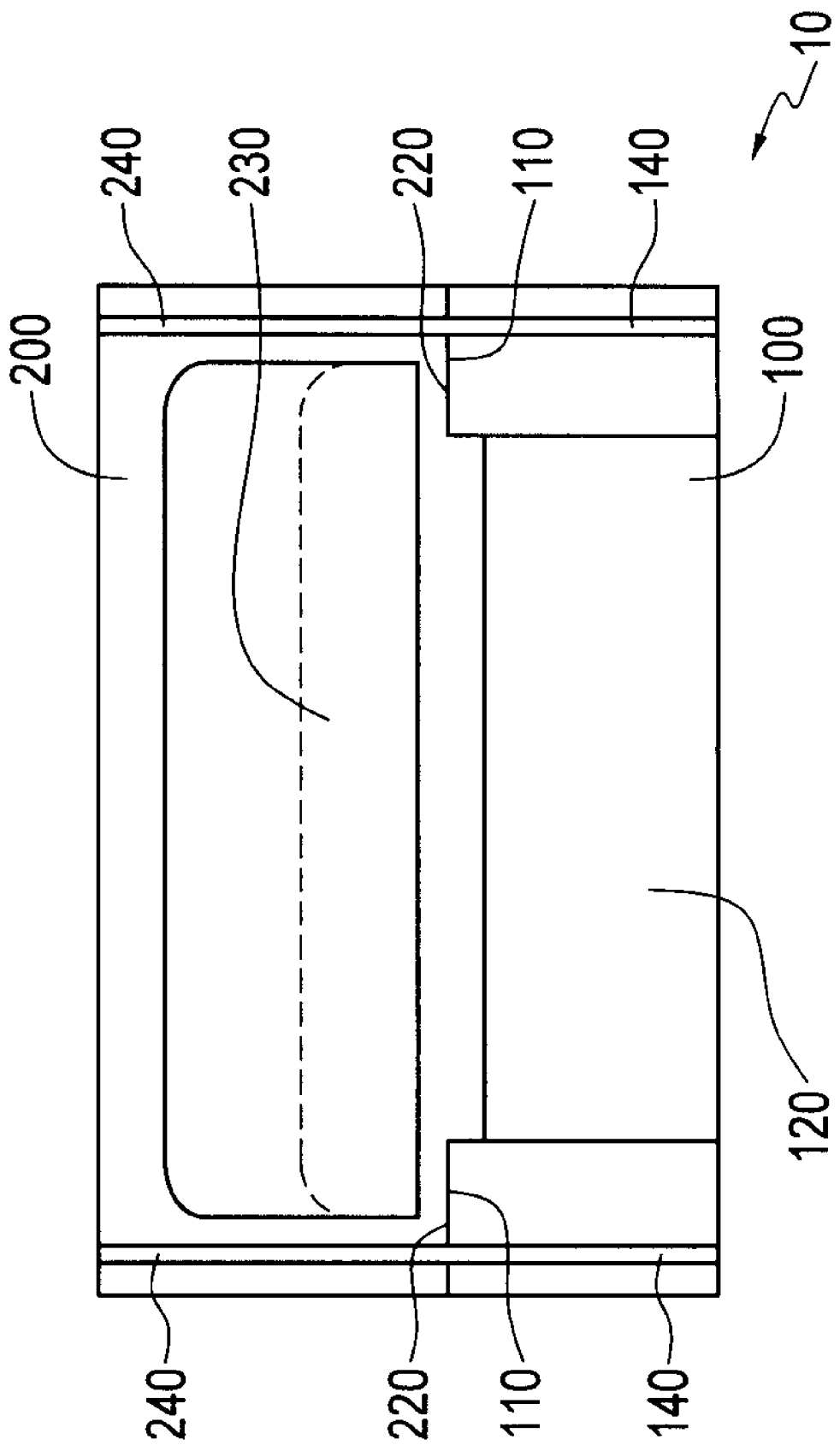
FIG. 1 is a side view of an eccentric bottom bracket assembly of the present invention having a first and second wing members mounted on a body member.

The eccentric bottom bracket assembly of the present invention comprises of an adjustable assembly that allows either a bicyclist or any bicycle repairman to adjust the assembly to either tighten or loosen the chain when a chain has come loose or fallen off the chain sprocket. FIG. 1 illustrates a side view of an eccentric bottom bracket assembly 10 of the present invention with a first wing member 200 and a second wing member 201 (not shown in this figure) mounted on top and over the body member 100 and circularly engaging the body member 100 forming an assembly 10 with a tubular and cylindrical shape. The first wing member 200 has wing surfaces 220 along the longitudinal axis of the body member 100 to fit on the wing surfaces of the body member 110 similarly located on the longitudinal axis of the body member 100. The wing surfaces 110, 111 of the body member are to accommodate the wing surfaces of the first and second wing members 220, 221 to provide a fit between the first wing member 200, the second wing member 201 (on the other side of the first wing member 200 but not shown in this figure) and over the body member 100 to provide a pivotal or movable connection at the wing surfaces 110, 111, 220, 221. The length of the first wing member 200 is identical to the length of the body member 100 to fit together in providing the eccentric bottom bracket assembly 10. In one preferred embodiment, the first wing member 200, the second wing member 201 (on the other side which is not shown in this figure), and the body member 100 are further engageably held together with two spring members 400, 401 (not shown in this figure). The spring members fit within the slit portions of the body member 140 and the slit portions of the wing member 240 to provide engageability, expandability and flexibility for the first and second wing members 200, 201 to expand outwards by slidably moving on the wing surfaces 110, 111 of the body member by lateral displacement of the wedge members and altogether forming a tubular and cylindrical shape of the eccentric bottom bracket assembly 10 to fit within the inner shell of the bottom bracket of the bicycle frame. Expanding the first and second wing members 200, 201 away from the body member 100 tightly engages the wing members against the inner shell of the bicycle frame while retracting the first and second wing members 200, 201 disengages from the inner surface of the shell. The expandable and retractable moving action of the first and second wing members 200, 201 will be more readily shown and understood in other figures. The body member 100 also has an optional recess 120 with a large indentation to provide a lighter weight bottom bracket assembly 10. The first wing member 200 also has a recess 230 to further lessen the overall weight of the bottom bracket assembly 10 whereby the outer surface of the body member 100 can be seen through the hollow recess 230 of the first wing member 200. The shape of the recess 230 can be any size as long as the wing members 200, 201 can function to provide housing for the wedge driver 300 with the two wedge members 305', 305" and fit with the wing surfaces of the body member 110, 111. The body member 100 and the first and second wing members 200, 201 can be made of any suitably hard material that resists wear and breakage, and is capable of being machined, molded, or otherwise fabricated to form a bottom bracket assembly that is light weight.

Figure 2:
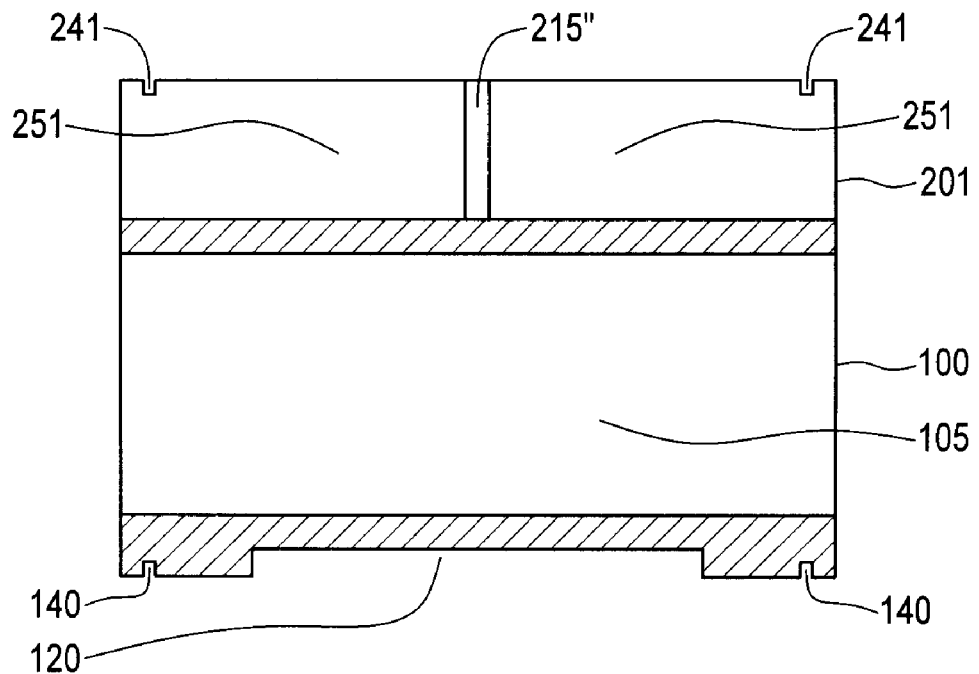
FIG. 2 is a cross-sectional side view of an eccentric bottom bracket assembly of the present invention showing a second wing member mounted on a body member.
Figure 3:
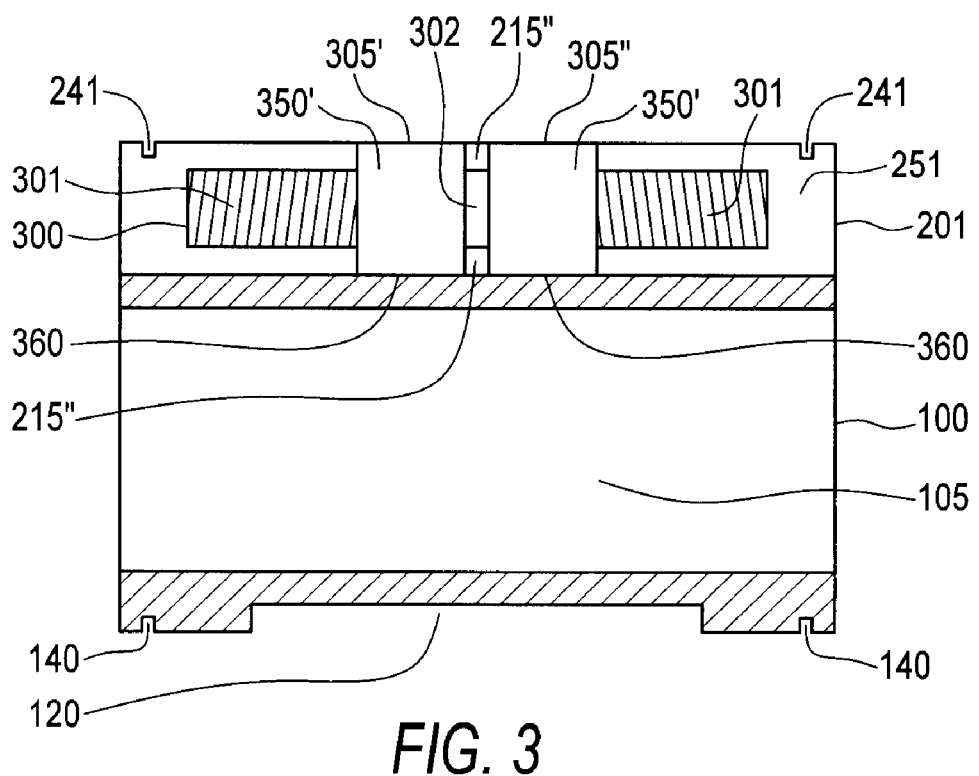
FIG. 3 is a cross-sectional side view of an eccentric bottom bracket assembly of the present invention showing a second wing member mounted on a body member and a wedge driver with two wedge members sitting on top of the body member with the lateral sides of the wedge members closely engaged and touching the wedge surfaces of the second wing member.

FIGS. 2 and 3 illustrate cross-sectional side views of an eccentric bottom bracket assembly 10 of the present invention. FIG. 2 shows a cross-sectional side view of the eccentric bottom bracket assembly comprising a body member 100, a first wing member 200 and a second wing member 201. Referring to FIGS. 2 and 3, the first wing member 200 is not shown for the purposes of demonstrating the cross-sectional view of the assembly 10. The second wing member 201 is mounted on top of the body member 100 and circularly engaging the body member 100. The body member 100 shows a hollow bore 105 to accommodate the pedal crank spindle or shaft of the bicycle which is not shown in this figure. The body member 100 also contains a recess 120 to provide a lighter weight bottom bracket assembly 10 of the present invention. In one embodiment of the present invention, the second wing member 201 has an internal wedge surface 250 that is concavely shaped with a retaining member 215". A retainer member is a notch with corresponding projections in the shape of a hook to receive the wedge driver 300. The slit portion of the second wing member 241 is shown for the spring member 400 to be disposed within the slit portion of the first and second wing members to flexibly and engageably hold together the body member 100, the first wing member 200, the second wing member 201, and the wedge driver 300 with the two wedge members 305.

FIG. 3 shows a cross-sectional side view of the eccentric bottom bracket assembly 10 with the body member 100 and the second wing member 201 mounted on the body member 100 as shown in FIG. 2, further comprising a wedge driver 300 with the two wedge members (305' and 305"). The cylindrical wedge driver 300 has two wedge members (305' and 305") which rotate through and around the wedge driver 300. For assembly, the two wedge members 305', 305" are rotated through and around the threaded cylindrical portion 301 of the wedge driver 300 to screw on the two wedge members 305', 305" inwardly to the smooth cylindrical portion of the wedge driver 302. The threaded cylindrical portion 301 is oppositely threaded such that the wedge members 305', 305" can be screwed on inwardly toward each other when rotating the wedge members on and around the wedge driver 300. Likewise, counterclockwise rotation of the wedge driver 300 also laterally displaces the wedge members 305', 305" outwardly from each other due to the oppositely threaded cylindrical portions 301.

The two wedge members 305', 305" have lateral surfaces 350 which engageably fit on the internal wedge surfaces of the first wing member 250 (not shown in this figure) and internal wedge surface of the second wing member 251. The retaining member 215" from the wedge surface of the second wing member 251 and the retaining member 215' from the wedge surface 250 of the first wing member (not shown in this figure) also hold in place the wedge driver 300, particularly the projections hugging over and under the smooth cylindrical portion of the wedge driver 302. The threaded cylindrical portion 301 of the wedge driver 300 is not touching any portion of the first or second wing member 200, 201 but sitting in the interior chamber 205 created between the first and second wedge surfaces 250, 251 of the first and second wing members 200, 201, while the flat bottom surfaces of the wedge members 360', 360" (not shown) touch the top of the body member 100.

FIGS. 4 and 5 illustrate top views of the eccentric bottom bracket assembly 10 of the present invention, comprising a first wing member 200 and a second wing member 201, sitting on over the body member 100 (not shown in this figure) tightly engaging a wedge driver 300 with the two wedge members 305', 305" in the interior chamber 205 between the first and second wing members 200, 201. In one preferred embodiment, the eccentric bottom bracket assembly 10 is circularly and flexibly held together using round, flexible spring members 400, 401 fitting within the slit portions of the second wing member 241, the slit portions of the body member 140, and the slit portions of the first wing member 240, to circulate around the bottom bracket assembly 10. The bottom bracket assembly 10 in FIG. 4 shows the cylindrical wedge driver 300 with the two wedge members 305', 305" engaged between the first wing member 200 and the second wing member 201. The lateral surfaces 350 of the two wedge members 305', 305" are engaged and laterally touching the internal wedge surfaces 250, 251 of the first and second wing members 200, 201. The retaining member 215', 215" of the first wing member 200 and the second wing member 201 have a notch with corresponding projections to receive the smooth cylindrical portion 302 of the wedge driver 300, and also provides some support to hold the wedge driver 300 in place. The flat bottom surfaces 360 of the wedge members 305', 305" sit on top of and touch the body member 100 which is not shown in this view. The hollow wedge driver 300 can be rotated using any type of tool, preferably an allen wrench, through the opening 320 of the wedge driver 300 from either side, causing the oppositely threaded cylindrical portion 301 of the wedge driver 300 to laterally displace the first and second wedge members 305', 305" in opposite direction away from the smooth cylindrical portion 302 of the wedge driver 300. As the two wedge members 305', 305" are oppositely and laterally displaced from the smooth cylindrical portion 302 due to rotation of the wedge driver 300, the interior chamber 205 between the first and second wing members 200, 201 is widened. The interior chamber 205 between the first and second wing members 200, 201 is widened because the wedge members 200, 201 are shaped with slightly wider portions toward the smooth cylindrical portion 302 of the wedge driver 300 that are gradually tapered down to narrower portions facing away from the center. The lateral surfaces 350 of the wedge members 305', 305" are laterally and oppositely displaced from each other while moving along the internal wedge surfaces 250, 251 of the first and second wing members 200, 201. As a result of the lateral displacement of the first and second wedge members 305', 305" away from each other, particularly the wider portions of the first and second wedge member 305', 305" moving outwardly away from each other causing the widening of the entire interior chamber 205 between the first and second wing members 200, 201. The lateral displacement of the two wedge members 305', 305" further causes the first and second wing members 200, 201 to circumferentially expand outwardly away from the body member 100 to tightly engage against the inner shell of the bottom bracket area. FIG. 5 shows the laterally displaced wedge members 305', 305" in opposite direction from each other with the widened interior chamber 205 which also simultaneously results in circumferential expansion of the two wing members 200, 201 away from the body member 100 causing circumferential expansion of the entire assembly 10.

FIGS. 6 and 7 illustrate front views of an eccentric bottom bracket assembly 10 of a preferred embodiment of the present invention, comprising a body member 100, a first wing member 200 and a second wing member 201, a wedge driver 300, and a first and second wedge members 305', 305". In FIG. 6, the body member 100 has a bore 105 to accommodate the pedal crank spindle or shaft (not shown in this figure) that fits through the bore 105. The diameter of the bore 105 or the inner circumference of the body member 100 is typically the diameter size of a conventional pedal crank spindle or shaft in the range of 1.0 to 1.8 inches. The outer diameter size of the body member 100 from one wing surface of the body member 110 to the other wing surface of the body member 111 is the diameter size of a conventional eccentric bottom bracket to fit within the inner shell of a bicycle frame (not shown in this figure). The nominal diameter of this outer diameter can be around 2⅛ inches. In a preferred embodiment, the body member 100 has two wing surfaces 110, 111 to accommodate the wing surfaces 220, 221 of the first and second wing members 200, 201 for a pivotal, hinged, movable or slidable connection. In a preferred embodiment, the two wing surfaces of the body member 110, 111 are concavely shaped to accommodate the convexly shaped wing surfaces of the wing members 220, 221, however, the present invention is not limited to this particular shape of the wing surfaces of the body member 110, 111 or the wing surfaces of the wing members 220, 221. The wing surfaces of the body member 110, 111 can be convexly shaped and the wing surfaces of the wing members 220, 221 can be concavely shaped to accommodate the wing surfaces of the body member 110, 111. As long as the wing surfaces of the body member 110, 111 and the wing surfaces of the wing members 220, 221 are connected to provide a slidable movement without being confined, any shape or form can be used for the wing surfaces.

The first wing member 200 and the second wing member 201 are mounted on top and over the body member 100 while the first and second wing members 200, 201 also encase a wedge driver 300 with the first and second wedge members 305', 305" as shown in FIG. 6. The first and second wing members 200, 211 have internal surfaces that are approximately cylindrical to mount on and over the cylindrical external surface of the body member 100 to complete a larger cylinder assembly 10 to fit within the bottom bracket area. The lateral surfaces of the wedge members 350', 351" are shown to touch the first and second wedge surfaces 250, 251 of the wing members 200, 201. In a preferred embodiment, the wedge surfaces of the first and second wing members 250, 251 are slightly concavely shaped to fit with the slightly convexly shaped lateral surfaces of the wedge members 350', 350" for easily displacing the wedge members 305', 305" laterally, outwardly and inwardly on the wedge surfaces 250, 251 of the first and second wing members 200, 201 when the wedge driver 300 is rotated clockwise or counterclockwise (motion more easily understood in FIGS. 4 and 5). However, the shape of the lateral surfaces of the wedge members 350', 350" is not limited to having a slightly convex shape and the wedge surfaces of the wing members 250, 251 having a slightly concave shape. The shape of the lateral surfaces of the wedge members 350', 350" and the wedge surfaces of the wing members 220, 221 can be modified as long as the wedge surfaces of the wing members 220, 221 fit with the lateral surfaces of the wedge members 350', 350".

The end portion of the wedge driver 300 is shown in FIGS. 6-7 with the first wing member 200 surrounding the wedge driver 300. In a preferred embodiment of the present invention, the wedge driver 300 has an opening 320 shaped to accommodate insertion of a portably lightweight piece of tool, such as an allen wrench, to rotate the wedge driver 300. The opening 320 is not limited to a shape to accommodate an allen wrench but can shaped in any form to be used with other easily portable and lightweight tools. As a tool is used to rotate the wedge driver 300, the wedge members 305', 305" are laterally and outwardly displaced from the center or each other, enlarging the interior chamber 205 between the first and second wing members 200, 201 and the body member 100 in which the wedge driver 300 and the wedge members 305', 305" are positioned. While the two wedge members 305', 305" are laterally displaced, the enlarging of the interior space 150 among the first and second wing members 200, 201 and the body member 100 also causes circumferential and outward expansion of the first and second wing members 200, 201 away from the body member 100 as shown in FIG. 7, allowing the first and second wing members 200, 201 to tightly engage against the inner shell of the bottom bracket (not shown in this figure). FIG. 7 shows the expanded position of the first and second wing members 200, 201 and the body member 100. The expanded position can be shown in FIG. 7 in which the expansion of the first and second wing members 200, 201 have circumferentially lifted up and away from the body member 100 leaving a slight interior space 150. Rotating the wedge driver 300 by inserting a piece of tool through the opening 320 in the end section in a counterclockwise direction, the expanded first and second wing members 200, 201 can adjustably retract back to its previously unexpanded position as shown in FIG. 6. The assembly 10 can be unexpanded and retracted in order to loosen the assembly 10, more particularly, the body member 100 and the first and second wing members 200, 201 toward each other and to disengage the assembly 10 to further rotatably adjust the assembly 10 for chain adjustment.

Furthermore, the first and second wing members 200, 201 have end surfaces 260 with at least one aperture 210, 211 on each wing member. The first wing member 200 has at least one aperture 210, and the second wing member 201 has at least one aperture 211. The two apertures 210 and 211 from the first and second wing members 200, 201 are used by a bicyclist to insert a pin-spanner type wrench in each aperture 210, 211 from the first and second wing members 200, 201 to rotate the eccentric bottom bracket assembly 10 in a clockwise or counterclockwise direction with the bottom bracket assembly 10 in its retracted position as shown in FIG. 6. In a preferred embodiment, the first wing member 200 has three apertures 210', 210", 210'" of varying aperture sizes on the end surfaces 260 of the first wing member 200, and the second wing member 201 also has three apertures 211', 211", 211'" of varying aperture sizes also on the end surfaces 260 of the second wing member 201. However, each wing member 200 or 201 is not required to have all three apertures. Each wing member can have only one aperture 210 or 211 to accommodate a pin spanner-type wrench for rotatably adjusting the eccentric bottom bracket assembly 10. Each of the first and second wing members 200, 201 can have as many apertures that can fit on the end surfaces 260. The aperture sizes are preferably shaped to accommodate a conventional pin spanner-type wrench to easily rotate the eccentric bottom bracket assembly 10 either a clockwise or counterclockwise direction to adjust the chain on a bicycle (not shown in this figure). Adjusting the eccentric bottom bracket assembly 10 is performed when the eccentric bottom bracket assembly 10 is in the retracted position as shown in FIG. 6 since the first and second wing members 200, 201 and the body member 100 are not expanded and tightly engaged against the inner shell of the bottom bracket of the bicycle frame.

Figure 8:
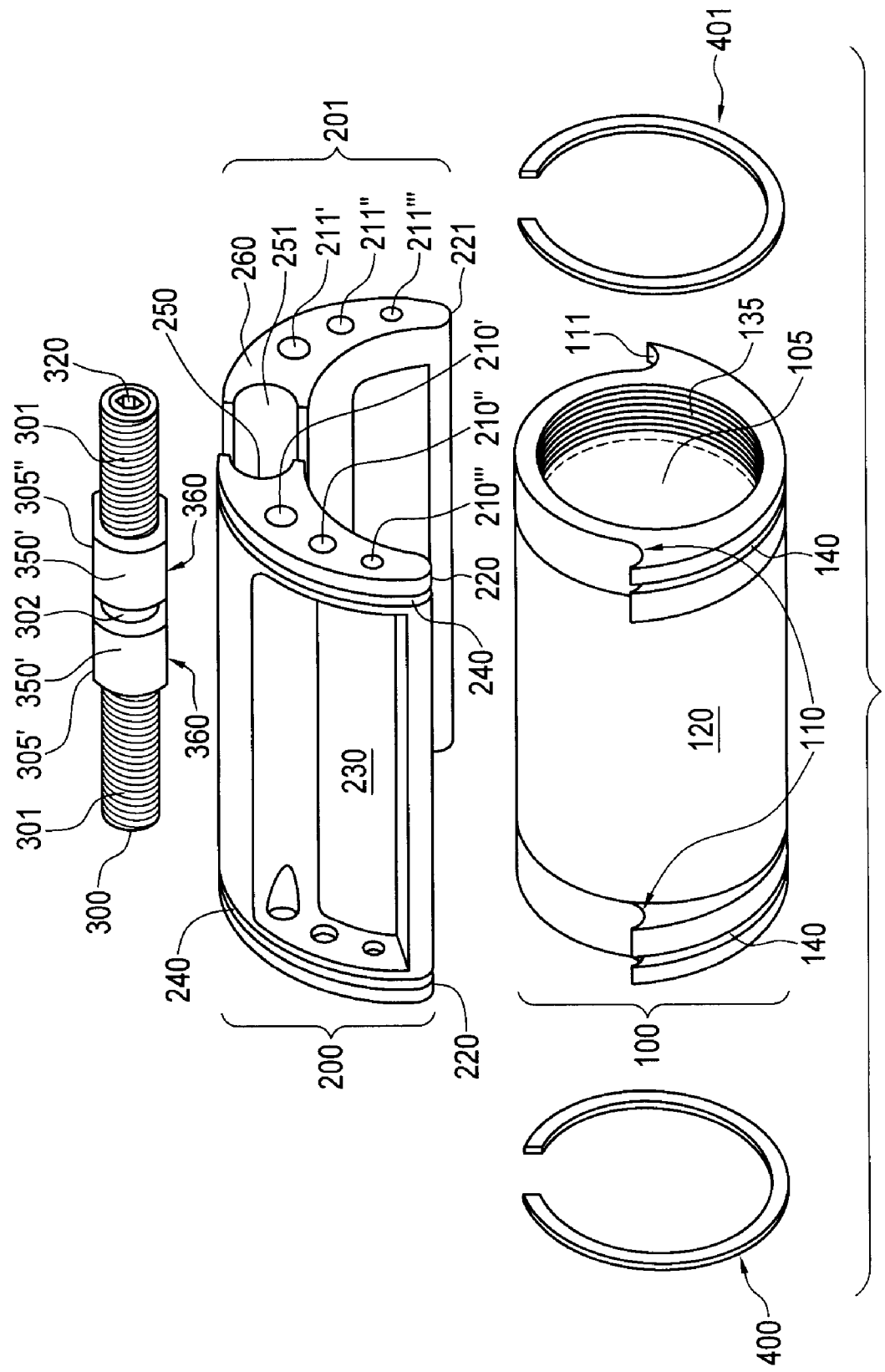
FIG. 8 is an exploded perspective view of the eccentric bottom bracket assembly showing a body member, a first and second wing members, a wedge driver with two wedge members and spring members prior to assembly.

FIG. 8 is an exploded view of the eccentric bottom bracket assembly 10 of the present invention in an unassembled state. The body member 100 has a recess 120 in the inner portion of the cylindrical portion on a longitudinal axis for a lighter weight eccentric bottom bracket assembly 10. The outer portions of the body member 100 on a longitudinal axis has outwardly protruded portions with wing surfaces 110, 111 of the body member 100 to fit with the first and second wing members 200, 201. The body member 100 is a hollow cylinder with a bore 105 with internal threaded portions 135 to accommodate a pedal crank spindle or shaft. A typical pedal spindle's diameter size can range from about 1.0 to 1.8 inches, therefore, the diameter of the bore can be within that range to accommodate the pedal shaft. The nominal diameter of the body member 100 with the first and second wing members 200, 201 mounted on and over the body member 100 can be around 2⅛ inches. The body member 100 also has at least one slit portion 140 for the spring member 400 to hold the eccentric bottom bracket assembly 10 altogether. In a preferred embodiment, the first spring member 400 and the second spring member 401 are used to hold the eccentric bottom bracket assembly together, however, the present invention is not limited to having two spring members 400, 401. The eccentric bottom bracket assembly 10 can also be assembled and joined together by using only one spring member 400. Even though the body member 100, the first and second wing members 200, 201 are made out of aluminum which are anodized, it is contemplated that the assembly 10 may comprise any relatively light-weight alloy, composite, anodized metal, or any suitably hard material having sufficient structural strength to withstand and maintain the assembly 10 in an engaged position to the inner surface of the shell.

The first and second wing members 200, 201 are shown in FIG. 8 which mount on the cylindrical portion of the body member 100. The wing surfaces 220, 221 of the first and second wing members 200, 201 fit with the wing surfaces of the body member 110, 111 to allow for a movable or slidable connection. The wing surfaces 220, 221 of the wing members 200, 201 are touching the wing surfaces of the body member 110, 111 while the first and second wing members 200, 201 are free to slidably pivot in a latitudinal axis of the body member 100 with the externally inward force provided by the spring members keeping together the wing members 200, 201 on the wing surfaces of the body member 110, 111. In a preferred embodiment, the wing surfaces of the body member 110, 111 are concavely shaped to fit with the convexly shaped wing surfaces 220, 221 of the first and second wing members 200, 201, however, the shape of the wing surfaces 220, 221, 110, 111 is not limited to this design. The wing surfaces of the body member 110, 111 can be convexly shaped, straight, curved, hinged or angled in a different manner as long as there is a fit between the wing surfaces of the body member 110, 111 and the wing surfaces of the first and second members 220, 221. The first and second wing members 200, 201 also have a recess 230 to lessen the overall weight of the eccentric bottom bracket assembly 10. In a preferred embodiment, the first and second wing members 200, 201 also have slit portions 240, 241 which align with the slit portions of the body member 140 forming a continuous cylindrical pathway for the spring members 400, 401 to encircle and hold together the eccentric bottom bracket assembly 10. The spring members 400, 401 are flexible and expandable so that the first and second wing members 200, 201 can flexibly and circumferentially expand out and flexibly retract back in.

FIG. 8 shows the wedge members 305', 305" already screwed over, through and around the wedge driver 300. The wedge members 305', 305" can be inwardly screwed and rotated on and around the threaded cylindrical portion 301 of the wedge driver 300 until the wedge members 305', 305" come to a halt at the middle, smooth cylindrical portion 302 of the wedge driver. Once the wedge members 305', 305" are screwed onto the wedge driver 300, the wedge driver 300 with the wedge members 305', 305" are ready to be further assembled with the rest of the parts of the assembly 10 including the first and second wing members 200, 201 and the body member 100. The wedge driver 300 with the wedge members 305', 305" fits within the interior chamber 205 or between the first and second wing members 200, 201 and over the body member 100. The lateral surfaces of the wedge members 350', 350" are touching the first and second wedge surfaces 250, 251 of the first and second wing members 200, 201. The flat bottom surfaces of the wedge members 360 are touching the top of the body member 100 in an unexpanded and assembled state. Even though the retaining member 215', 215" of the first and second wing members 200, 201 cannot be seen in this figure, the retaining members 215', 215" provide a notch and corresponding projections to hold the smooth cylindrical portion 302 of the wedge driver 300 in its assembled position with the wedge members. When first and second wing members 200, 201 are mounted on the body member 100 with adjoining wing surfaces, the wedge driver 300 with the wedge members 305', 305" is placed between the first and wing members 200, 201, and all the parts can be held altogether using at least one spring member 400 making it the eccentric bottom bracket assembly 10. In the preferred embodiment, the first and second spring members 400, 401 are used to hold the eccentric bottom bracket assembly 10 comprised of the body member 100, the first and second wing members 200, 201, and the wedge driver 300 with the first and second wedge members 305', 305". In one preferred embodiment, the wedge driver 300 is a hollow structure with a threaded cylindrical portion 301 made out of steel, however, any appropriate screw or device can be used for allowing lateral displacement of the wedge members 305', 305" made of alloy, composite or other materials.

The present invention can be practiced in this one preferred embodiment when a bicyclist assembles the bottom bracket assembly 10 by joining the body member 100, the first and second wing members 200, 201, the wedge driver 300 with the first and second wedge members 305', 305", and at least one spring member 400. The bottom bracket assembly 10 is assembled to be inserted within the bottom bracket of the shell of the bicycle frame. When the bottom bracket assembly 10 is inserted within the bottom bracket of the shell of the bicycle frame, the pedal shaft can be inserted into the bore 105 of the body member 100 and rotated to tighten the pedal crank spindle with pedals against the internal threaded portion 135 of the body member 100. The chain tension can be adjusted by rotatably adjusting the bottom bracket assembly 10 by inserting a pin spanner type wrench through at least one aperture 210, 211 located on the end surfaces 260 of the first and second wing members and rotatably adjusting the bottom bracket assembly 10 until the desired position is found. To keep the desired position of the bottom bracket assembly 10, a bicyclist can insert a tool through the opening 320 of the wedge driver 300 to rotate the wedge driver 300 in a clockwise direction to tighten the bottom bracket assembly 10 against the inner surface of the shell of a bicycle frame. When the desired position of the bottom bracket assembly 10 is secured and chain tension adjusted, the bicycle is ready for riding. If the chain tension needs readjusting or the chain falls off, a bicyclist can stop and loosen the bottom bracket assembly 10 by inserting a tool through the opening 320 of the wedge driver 300 to rotate the wedge driver 300 in a counter-clockwise direction until the entire bottom bracket assembly 10 is loosened from the inner surface of the shell of a bicycle frame. The process of rotatably adjusting the bottom bracket assembly 10 can be repeated to adjust the bottom bracket assembly 10 and to find the desired position for the bottom bracket assembly 10 for optimal chain tension prior to tightening and securing the bottom bracket assembly 10.

It can also be appreciated by one skilled in the art that while two spring members are depicted for use in the eccentric bottom bracket assembly 10, one spring member or multiple spring members may be incorporated in the assembly by varying the slit portions of the assembly. Taking out a spring member or adding on more spring members requires, however, a further modification of the assembly. Consequently, within the scope of the appended claims, it will be appreciated that the invention can be practiced otherwise with many other modifications and variations ascertainable to those of skilled in the art than is specifically described herein.

What is claimed is:

1. A bottom bracket assembly in a bottom bracket portion of a bicycle frame requiring one bottom bracket assembly for the bicycle frame, said bottom bracket assembly comprising:
   (a) a body member having a longitudinal axis for mounting within the bicycle frame and for receiving a pedal shaft, said body member having:
      at least two wing surfaces on said body member that are internally located and parallel with respect to the longitudinal axis of said body member;
      a bore comprising substantially the entire hollow inner cylinder portion of said bottom bracket assembly and having an axis parallel to the longitudinal axis of said body member to receive the pedal shaft; and
      a first cylindrical external surface located immediately beneath an inner surface of a shell of the bicycle frame;
   (b) at least a first wing member and a second wing member that are separate structures from said body member, said first wing member and said second wing member having an axis parallel to the first cylindrical external surface of the body member, said first and second wing members each having:
      a wing surface for cooperation with one of said at least two wing surfaces of the body member; and
      a wedge surface located to cooperate with a wedge driver, said wedge driver further comprising at least two wedge members located between said first and second wing members; and
      a second cylindrical external surface located immediately beneath the inner surface of the shell of the bicycle frame;
   whereby, when said wedge driver is rotated, said at least two wedge members are laterally displaced co-acting with said first and second wing members to circumferentially expand away from said body member such that the cylindrical external surfaces of said assembly are engageable with the inner surface of the shell of the bicycle frame.

2. The bottom bracket assembly of claim 1, said bottom bracket assembly having at least one spring member positioned within at least one slit portion of said first and second wing members and disposed within at least one slit portion of said body member engaging and holding together said body member, said first and second wing members and said wedge driver with said at least two wedge members.

3. The bottom bracket assembly of claim 1, wherein said bore of the body member has an internal threaded portion for receiving said pedal shaft of a bicycle.

4. The bottom bracket assembly of claim 1, wherein each of said first and second wing members has at least one aperture on an end portion in which a tool can be inserted to said at least one aperture of said first member and said second wing member for rotatably adjusting said bottom bracket assembly.

5. The bottom bracket assembly of claim 1, wherein said wing surfaces of said first and second wing members are received by said at least two wing surfaces of the body member allowing a movable connection between said first and second wing members and said body member.

6. The bottom bracket assembly of claim 1, wherein said at least two wedge members have lateral sides engaging said wedge surfaces of said first and second wing members to allow for lateral displacement of said at least two wedge members away from each other when said wedge driver is rotated in a clockwise direction and toward each other when said wedge driver is rotated in a counterclockwise direction.

7. The bottom bracket assembly of claim 1, wherein said wedge driver comprises a hollow cylindrical structure with a threaded cylindrical portion that is engageable with said at least two wedge members.

8. The bottom bracket assembly of claim 1, wherein said wedge driver has an opening in an end portion in which a tool can be inserted to said opening of said wedge driver to rotate said wedge driver in a counterclockwise direction to laterally displace said at least two wedge members toward each other and retract said first and second wing members and said body member to disengage from said inner surface of the shell of the bicycle frame.

9. A bottom bracket assembly for a bicycle frame, said bottom bracket assembly comprising:
(a) a body member having a longitudinal axis for mounting within the bicycle frame and for receiving a pedal shaft, said body member having:
at least two wing surfaces on said body member that are parallel with respect to the longitudinal axis of said body member;
a bore having an axis parallel to the longitudinal axis of said body member;
at least one slit portion that is perpendicular with respect to the longitudinal axis of said body member;
(b) at least a first wing member and a second wing member, said first wing member and said second wing member having an axis parallel to a cylindrical external surface of the body member, said first and second wing members each having:
a wing surface for cooperation with one of said at least two wing surfaces of the body member;
a wedge surface located to cooperate with a wedge driver, said wedge driver further comprising at least two wedge members located between said first and second wing members, said wedge driver having an opening in an end portion in which a tool can be inserted to said opening to rotate said wedge driver;
at least one slit portion that is perpendicular with respect to the longitudinal axis of said body member and aligned with said at least one slit portion of said body member; and
(c) at least one spring member positioned within said at least one slit portion of the body member and disposed within said at least one slit portion of said first and second wing members, said at least one spring member engaging and holding together said body member, said first and second wing members and said wedge driver with said at least two wedge members;
whereby, when said wedge driver is rotated in a clockwise direction, said at least two wedge members are laterally displaced away from each other and co-acting with said first and second wing members to circumferentially expand away from said body member such that said assembly is engageable with an inner surface of a shell of the bicycle frame; and
whereby, when said wedge driver is rotated in a counterclockwise direction, said at least two wedge members are laterally displaced toward each other and retract said first and second wing members and said body member to disengage from said inner surface of the shell of the bicycle frame.

10. The bottom bracket assembly of claim 9, wherein said bore of the body member has an internal threaded portion for receiving said pedal shaft of a bicycle.

11. The bottom bracket assembly of claim 9, wherein each of said first and second wing members has at least one aperture on an end portion in which a tool can be inserted to said at least one aperture of said first member and said second wing member for rotatably adjusting said bottom bracket assembly.

12. The bottom bracket assembly of claim 9, wherein said wing surfaces of said first and second wing members are received by said at least two wing surfaces of the body member allowing a movable connection between said first and second wing members and said body member.

13. The bottom bracket assembly of claim 9, wherein said at least two wedge members have lateral sides engaging said wedge surfaces of said first and second wing members to allow for lateral displacement of said at least two wedge members away from each other when said wedge driver is rotated in a clockwise direction and toward each other when said wedge driver is rotated in a counterclockwise direction.

14. The bottom bracket assembly of claim 9, wherein said wedge driver comprises a hollow cylindrical structure with a threaded cylindrical portion that is engageable with said at least two wedge members.

15. The bottom bracket assembly of claim 9, wherein said wedge driver is received by a retainer member from said wedge surfaces of said first and second wing members.

16. A bottom bracket assembly for a bicycle frame, said bottom bracket assembly comprising:
(a) a body member having a longitudinal axis for mounting within the bicycle frame and for receiving a pedal shaft, said body member having at least four wing surfaces on said body member that are parallel with respect to the longitudinal axis of said body member; a bore having an axis parallel to the longitudinal axis of said body member; and at least two slit portions that are perpendicular with respect to the longitudinal axis of said body member;
(b) at least a first wing member and a second wing member, said first wing member and said second wing member having an axis parallel to a cylindrical external surface of the body member, said first and second wing members each having at least two wing surfaces to fit over said at least four wing surfaces of the body member; said first and second wing members each having a wedge surface located to cooperate with a wedge driver further comprising at least two wedge members located between said first and second wing members; and said first and second wing members each having at least two slit portions that are perpendicular with respect to the longitudinal axis of said body member and aligned with said at least two slit portions of said body member;

(c) the wedge driver having an opening in an end portion in which a tool is insertable within said opening to rotate said wedge driver in a clockwise direction, said at least two wedge members being laterally displaced and cooperating with said first and second wing members to circumferentially expand away from said body member such that said bottom bracket assembly is engageable with an inner surface of a shell of the bicycle frame;

(d) at least two spring members positioned within said at least two slit portions of the body member and disposed within said at least two slit portions of said first and second wing members, said at least two spring members engaging and holding together said body member, said first and second wing members and said wedge driver with said at least two wedge members; and (e) at least three apertures positioned on an end portion of each said first and second wing members in which a tool is insertable within any of said at least three apertures of said first and second wing members for rotatably adjusting said bottom bracket assembly.

17. The bottom bracket assembly of claim 16, wherein said bore of the body member has an internal threaded portion for rotating and receiving said pedal shaft of a bicycle.

18. The bottom bracket assembly of claim 16, wherein said wing surfaces of said first and second wing members are received by said at least four wing surfaces of the body member allowing for a pivotal connection between said first and second wing members and said body member.

19. The bottom bracket assembly of claim 16, wherein said at least two wedge members have lateral sides engaging said wedge surfaces of said first and second wing members to allow for lateral displacement of said at least two wedge members away from each other when said wedge driver is rotated in a clockwise direction and toward each other when said wedge driver is rotated in a counterclockwise direction.

20. The bottom bracket assembly of claim 19, wherein said lateral sides of the wedge members are convexly shaped, and said wedge surfaces of said first and second wing members are concavely shaped whereby said convexly shaped lateral sides of the wedge members cooperate with said concavely shaped wedge surfaces of said first and second wing members.

21. The bottom bracket assembly of claim 16, wherein said wedge driver comprises a hollow cylindrical structure with a threaded cylindrical portion that is engageable with said at least two wedge members.

22. The bottom bracket assembly of claim 16, wherein said wedge driver is received by a retaining member from said wedge surfaces of said first and second wing members.

23. The bottom bracket assembly of claim 16, wherein said opening of the wedge driver in which said tool is insertable within said opening to rotate said wedge driver in a counterclockwise direction to laterally displace said at least two wedge members toward each other and cooperating with said first and second wing members to retract toward said body member such that said bottom bracket assembly is disengageable from said inner surface of the shell of the bicycle frame.

24. The bottom bracket assembly of claim 23, wherein said opening is shaped to accept an allen wrench.

* * * * *

UNITED STATES PATENT AND TRADEMARK OFFICE
CERTIFICATE OF CORRECTION

Page 1 of 1

PATENT NO. : 8,070,633 B2
APPLICATION NO. : 11/740839
DATED : December 6, 2011
INVENTOR(S) : Dennis L. Bushnell It is certified that error appears in the above-identified patent and that said Letters Patent is hereby corrected as shown below:

| | |
|---|---|
| Title Page (73) Assignee: | "BikeBiz, Ill, Inc." should read --BikeBiz III, Inc.-- |
| Column 3, line 5 | "sides" should read --side-- |
| Column 3, line 53 | "fit" should read --fitting-- |
| Column 4, line 11 | after "of" insert --the-- |
| Column 4, line 52 | "members" should read --member-- |
| Column 4, line 66 | "members" should read --member-- |
| Column 4, line 67 | "positions" should read --position-- |
| Column 5, line 5 | "members" should read --member-- |
| Column 5, line 6 | "positions" should read --position-- |
| Column 5, line 9 | "members" should read --member-- |
| Column 5, line 17 | "members" should read --member-- |
| Column 5, line 25 | "members" should read --member-- |
| Column 5, line 31 | after "comprises" delete "of" |
| Column 7, line 1 | after "and" insert --the-- |
| Column 7, line 19 | after "on" insert --and-- |
| Column 7, line 47 | "direction" should read --directions-- |
| Column 7, line 66 | "causing" should read --cause-- |
| Column 9, line 13 | after "can" insert --be-- |
| Column 10, line 2 | after "10" insert --in-- |

Signed and Sealed this
Seventh Day of February, 2012

David J. Kappos
*Director of the United States Patent and Trademark Office*